United States Patent Office 2,749,243
Patented June 5, 1956

2,749,243

METHOD OF MAKING A FOOD PRODUCT

Herbert Thal Leo and Clarence C. Taylor, Anaheim, Calif.

No Drawing. Application November 24, 1953,
Serial No. 394,211

7 Claims. (Cl. 99—132)

This invention relates to a food product and to a method of preparing the same. More particularly, the invention relates to a fruit product prepared from fresh and frozen fruits and/or fruit juices, and sugar, pectin and acid under such conditions as to require no boiling to effect a set and in such proportions as to resist ice crystal formation when subjected to the same refrigeration temperatures as frozen foods.

In the making of conventional pectin-type jams and jellies, the sugar content of at least 65% by weight of the whole mass of fruit, sugar, acid and water which is required in order to come within the definition approved by the Federal authorities for a jam or jelly, is usually reached by boiling off whatever excess water is necessary.

In accordance with our present invention, we use proportions of fruit and sugar under such pH conditions that it is not necessary to do more than heat the mass to around body temperature, if heating at all is necessary, in order to get the sugar into solution, and then by adjusting the pH downwardly we bring about a setting of the product to at least a spreadable, and generally a firm consistency. The product may be subjected to refrigeration temperatures along with frozen fruits and other food products, and kept either at such lower refrigeration temperatures or at ordinary ice box temperatures. The soluble solids content of the product is such that the product will not freeze out water or crystallize out sugar even at 0° F. Consequently, our product can be used immediately, since it is suitable for spooning and spreading, upon being taken out of the sharp freeze chamber of the refrigerator. In contrast, to this, quick frozen fruit and fruit concentrates generaly must be held at ordinary ice box temperatures (40 to 50° F.) for upwards of six hours before being consumed in order to give the ice crystals in such products time to melt.

For our purposes, the total soluble solids content of our product should be between 55 and 65%. The soluble solids content is, of course, largely made up by the sugar (within which term is here included sucrose, invert sugar and corn syrup), but the soluble solids content of the fruit, fruit concentrate, pectin and acid is also figured in on the total soluble solids content. On this basis, as just indicated, the total soluble solids content of our preparations is kept between 55 and 65%. If much lower than 55%, ice crystals will form during sharp refrigeration, and if above about 65%, the mass is likely to set prematurely during preparation.

It is, of course, not broadly new to prepare a pectin-type jam or jelly with less than 65% total soluble solids content. This has doubtless been done by many workers in the field where the jam or jelly was not made for commercial purposes but for home consumption or was being made for experimental reasons. One of us, Herbert T. Leo, published an article in The Canner (February 1925), pp. 41 to 43, in which he showed that if the sugar content is varied between 45 and 70% the pectin should be varied in inverse relationship. From that article it can be seen that if one (1) unit of pectin is needed to jell a mass containing 65 parts of total soluble solids, then one and one-quarter (1¼) units of pectin would be required if the total soluble solids content were 60%, and one and one-half (1½) units of pectin would be required for 55% total soluble solids. That same relationship holds true in the method of our present invention. It is also true here, as stated in the article referred to, that the lower the proportion of sugar, the slower the setting time.

The pectin that we prefer to use is a pectin such as disclosed in our copending application Serial No. 235,376, filed July 5, 1951. This is a pectin which is ordinarily referred to as a high methoxyl pectin. As there disclosed, the pectin is one that can be made by the processes described in Patents Nos. 2,392,854 and 2,425,947. The pectin is intentionally relatively coarsely ground so as to be between 30 and 80 mesh, since the coarser particle size pectin has been found to be more readily dispersible in water. Inasmuch as the pectin is not itself water soluble, an edible alkali metal salt of an organic oxy acid, such as sodium citrate, sodium tartrate, or any of the corresponding potassium salts, is incorporated with the pectin as a pectin-solublizing agent. The resulting dry pectin composition is one that can be readily put into solution by merely mixing with ordinary tap water at the usual temperature of "cold" tap water and then stirring vigorously for at least a minute. The resulting solution is then ready for use in the process of our invention.

For household use, the housewife would be supplied a pectin composition having as a whole a grade preferably equivalent to a 200 jelly units grade. The sodium citrate, or its equivalent in the form of an edible alkali metal salt of another organic oxy acid, would be present in this pectin composition in an amount sufficient not only to dissolve any aluminum-hydroxide, or other metal hydroxide or oxide, in the pectin, but also to buffer the resulting water solution of the composition to a pH of between 3.50 and 4.50, and preferably to a pH of 4.20. The granular pectin and the granular sodium citrate, or other alkali metal salt of an organic oxy acid, should be of substantially the same mesh size, since this aids in the dispersion and solution of the pectin.

In order that the pectin may have wide applicability for practicing our process in the household, it should either be in water solution, or be capable of being made up into a water solution having a jelly grade of 6¼ or higher and having a pH of between 3.50 and 4.50, and preferably around 4.20. Since some fruit juices have pH values as low as 2.8, if the pH of the pectin solution were less than 3.50, there would be a tendency for the naturally low pH fruit-sugar mass to set prematurely upon addition of the pectin solution, and this would result in a poor texture. By using a pectin solution of the pH values indicated, and adding the acid last, premature jell formation is avoided so that the pectin solution can be completely mixed in with the fruit and sugar, without spoiling the texture. In some instances, the acid can be added to the mass in the kettle, after the addition of the pectin, and in some instances it is preferable to place the acid in the jars, or containers, in which the fruit product is to be shipped or stored.

It is therefore an important object of this invention to provide a fruit-sugar-pectin food product that can be kept under refrigeration conditions from the time it is made from fresh or frozen natural (uncooked) fruit or fruit concentrates, and that will thus retain its freshness, and yet be used direct from storage under freezing temperature conditions without having to be thawed out first.

It is a further important object of this invention to provide a method of making a food product in which the freshness of the fruit used is retained by maintaining the product refrigerated at below freezing temperatures yet the product does not require more than ordinary refrigeration temperatures for keeping in the home and remains unharmed when successively subjected to freezing and thawing conditions.

It is a further important object of this invention to provide a method of making a fruit-sugar-pectin product having a total soluble solids content such that the product will not form ice crystals when subjected to freezing temperatures and yet, without boiling off any portion of the initial mass at any stage of its preparation, the product will set to a jell under both normal room and refrigeration temperatures.

It is a further important object of this invention to provide a method that is adapted for either commercial or home use, and that affords a fruit-sugar-pectin product of lower sugar content than conventional jams and jellies, which can be made without the use of high temperatures at any stage and that can be kept under deep freezing temperatures for long periods of time without deleterious effect.

Other and further important objects of this invention will become apparent from the following description and appended claims.

As the initial step in our process a proper pectin solution is prepared. Where this is to be done in the home, a dry pectin composition is provided for the housewife that is entirely suitable. This may take the form of a pectin composition of the following formula:

80 parts by weight 250 grade pectin
5 to 7½ parts by weight sodium citrate
Balance—dextrose The above pectin composition would have a grade equivalent to 200 jelly units, so that if a ¼ oz. of the pectin composition were added to one cup (8 fluid ounces) of water, or of fruit juice, the resulting aqueous solution of pectin would have a jelly grade of 6¼. Further details as to the source and characteristics of the pectin used and as to the properties of the pectin and the manner of making up a solution thereof are given in our application Serial No. 235,376, filed July 5, 1951, to which reference is specifically made for such further information. As contrasted with the disclosure in that application, however, it is preferable for present purposes to omit the acid from the pectin composition, either in dry form or in aqueous solution, since, as already pointed out, the incorporation of the acid into the pectin at this early stage limits the adaptability of the pectin solution for our purposes. This is because the earlier addition of acid may lower the pH of the mass to below 3.50, which is our lower limit for the pH of the mass up to the point when all of the pectin and sugar have been dissolved in the fruit juice.

Where our method is to be carried out on a commercial scale, the method of making the pectin solution may be similar to that described in our copending application Serial No. 258,297, filed November 26, 1951, but the dry pectin and sodium citrate are preferably dissolved in the fruit juice, rather than separately in water so as to reduce dilution to a minimum. As there indicated, if one starts with a dry pectin having a jelly grade of about 250, a solution having a jelly grade of 6¼ may be prepared by dissolving 100 parts by weight of the pectin into 3875 parts by weight of water (or fruit juice). As soon as the dispersion is comparatively uniform 25 parts by weight of sodium citrate are added in dry form and the agitation continued until complete dissolution of the pectin takes place.

Regardless of whether the pectin solution is made up on a commercial scale or in the home, the solution should have a jelly grade equivalent to at least 6 jelly units and a pH of between 3.50 and 4.50, and preferably 4.20. The following examples refer to the use of a previously prepared aqueous pectin solution of 6¼ jelly units grade and having a pH of about 4.20.

*Example 1.—Food preparation from frozen berries*

Two commercial 12 oz. packages of frozen strawberries (3 parts by weight of fruit and 1 part by weight of sugar) were partially thawed out by setting them in warm water for fifteen minutes. The strawberry masses were then dumped into a four-quart kettle, to which were added three and one-half level cups of sugar and one cup of a light corn sugar syrup (glucose) obtainable under the trademark "Karo." As the sugar went into solution, the ice crystals quickly melted, but since the mass was still very cold, it was raised to a temperature of about 100° F., or around "body temperature." This was done in order to complete the dissolution of the sugar.

After the sugar was completely dissolved, one-half cup of aqueous pectin solution of 6¼ jelly unit grade was added to the kettle and thoroughly mixed in without further heating. There was then added one-eighth ounce of tartaric acid, containing some vitamin C for the prevention of oxidation. Calculating the proportions of ingredients and expressing them in terms of soluble solids, both in ounces and in percentages, we have the following:

|  | Kettle Batch, Oz. | Soluble Solids, Oz. |
|---|---|---|
| 2-12 oz. pkgs. frozen (3 plus 1) berries | 24.00 | 8.0 |
| 3½ level cups sugar×7 oz. | 24.50 | 24.5 |
| 1 cup light glucose 75% solids | 12.00 | 9.00 |
| ½ cup liquid Pectin | 4.00 | .25 |
| ⅛ oz. tartaric acid in 2 fl. oz. H$_2$O | 2.00 | .12 |
|  | 66.5 | 41.87 |

$$\frac{41.87 \times 100}{66.5} = 63\% \text{ total soluble solids}$$

$$\frac{41.5 \times 100}{66.5} = 62\% \text{ total sugar}$$

With regard to the pH values at different stages of the preparation of the finished food product, the pH of the aqueous pectin solution has already been given as about 4.20. The pH value of the strawberry-sugar mass, prior to the addition of the aqueous pectin solution, was approximately 3.20, while upon addition of the aqueous pectin solution, the pH went up to about 3.45. Upon the final addition of the acid, the pH value will drop to about 3.00 to 3.20. At this latter pH, there can occur no pre-set of the fruit-sugar-pectin-acid mass, but the mass will set upon standing, and may be placed in a refrigerator, or, if desired, it can be refrigerated at around 0 to 10 below 0° F. If the product has been stored at zero or sub-zero temperatures, it may be transferred to a regular refrigerator at a temperature of between 30° and 50° F., from which it can be used as required, just as other refrigerated foods are used.

One of the important features of our product is that the soluble solids content is sufficiently high that water does not freeze out of the product at temperatures as low as zero degrees F. In order to insure this, the total soluble solids content should not be below 55% by weight of the total product. On the other hand, the total soluble solids content should not be above 65% as a maximum, since if the solids content is any higher than that, the product is likely to set prematurely. Actually, sucrose is not soluble in water at around 32° F. to more than about 64% by weight, so that in order to prevent crystallizing out of the sugar, as well as the formation of ice crystals, the sucrose content should not be carried much over 55% by weight. It is helpful to use dextrose, dextro-glucose, or other invert sugar, in place of some of the cane sugar, or sucrose, since the invert sugar increases the solubility of the total sugar content at the low temperatures to which our product is carried. Consequently, if the total soluble solids content is to be over 55%, dextrose or other invert sugar should be used to supply the balance of the total solids in excess of 55%. In fact, it is preferable not to use more than a total of 45% of sucrose by weight of the finished product and to use an invert sugar to supply whatever balance is necessary to bring the total soluble solids to between 55 and 65%.

In addition to providing a process for the housewife to follow in making a finished product embodying our invention, we also propose to make the finished product itself available on the market. The finished product cannot be termed a "jam," or "preserve," since the standards set for these products require starting with at least 45% of fruit and 55% of sugar and boiling off to a 65% sugar solids content. In order to avoid the misuse of these terms, we have simply designated our product as a food product, or as a fruit product.

The following will serve to give a preferred example of the application of our invention to the preparation of a food product from fresh, unfrozen fruit.

Example 2

40 oz. of crushed fresh strawberries, 9 level cups of sugar and 1 pint of glucose (80° Brix) are added to a kettle and the temperature brought to about 100° F. and kept at that temperature until all of the sugar has dissolved. A cup of aqueous pectin solution having a jelly unit grade of 6¼ is then added, and following complete mixing of the pectin there is added ¼ cup of an aqueous solution of tartaric acid containing ¼ ounce of the acid itself. These quantities are given in ounces and in percentages in the following table:

|  | Kettle Batch, Oz. | Soluble Solids, Oz. |
|---|---|---|
| 40 oz. crushed fresh berries | 40 | 4.00 |
| 9 level cups sugar×7 oz | 63 | 63.00 |
| 1 pint glucose 80° | 24 | 19.20 |
| 1 cup liquid pectin | 8 | .50 |
| ¼ cup acid solution (¼ oz. tartaric acid) | 2 | .25 |
|  | 137 | 86.85 |

$$\frac{86.85 \times 100}{137} = 62\% \text{ soluble solids}$$

$$\frac{82.20 \times 100}{137} = 60\% \text{ total sugar}$$

After all of the ingredients had been added, the mass was poured from the kettle into suitable containers and subjected to refrigeration temperatures similar to those used in the preparation of frozen berries. The housewife would then buy the product the same as she would frozen foods, but it could be used immediately without placing in a regular refrigerator to thaw out, since even at temperatures as low as zero degrees F. there would be no ice crystals in our product owing to the high total solids content. Alternatively, of course, our product could be served at ordinary room temperature, the same as any jam or preserve. In order to capture the "freshness" of the fruit and retain it, it has been found expedient to employ refrigeration temperatures immediately following the preparation of the product.

Example 3—Preparation of a Grape Jell

In the preparation of a grape jell, 3 cups of grape juice, 1 cup of dextro-glucose and 5½ level cups of sugar were put in the kettle and heated to around body temperature to bring the sugar into solution. As soon as all the sugar was in solution, 1 cup of aqueous pectin solution having a jelly unit grade of 6¼ and a pH of around 4.20, was added. In this case, the acid was not added to the jell but appropriate amounts of acid solution were added to the containers into which the contents of the kettle were to be poured. For instance, if a ¼ ounce of tartaric acid were dissolved in a ¼ cup of water, then 2 teaspoonfuls of the resulting solution would be added to each 8 oz. glass into which the contents of the kettle were to be poured. This would bring the pH from about 3.60, before addition of the acid, to between 2.80 and 2.90 after the addition of the acid. After pouring, the product was allowed to stand and was found to be set in about one hour.

The following table gives the weight and percentages of ingredients in the preparation of the product of Example 3:

|  | Kettle Batch, Oz. | Soluble Solids, Oz. |
|---|---|---|
| 3 cups grape juice | 24 | 3.0 |
| 1 cup glucose (light) | 12 | 9.0 |
| 5¼ level cups sugar | 38 | 38.0 |
| 1 cup liquid pectin (no acid) | 8 | .7 |
| ¼ oz. tartaric acid in ¼ cup water | 2 | .3 |
|  | 84 | 51.0 |

$$\frac{51 \times 100}{84} = 60.7\% \text{ soluble solids}$$

$$\frac{47 \times 100}{84} = 56.0\% \text{ sugar}$$

To illustrate the importance of the control of the pH value, some of the product prepared in accordance with the procedure in Example 3, but with no additional acid in the kettle or in the glass, was poured into a glass and allowed to stand. After twenty-four hours it was still a syrup and would not jell. The pH value, which was around 3.60, was too high for a jell to form, yet as soon as the pH value was brought down to around 2.80 or 2.90, the product jelled very beautifully. At no time in its preparation was the product subjected to boiling temperatures.

With some fruits, such as boysenberries, red raspberries and loganberries, the pH of the natural fruit is so low, sometimes in the neighborhood of 3.15 to 3.25, that it is desirable to buffer the fruit, or fruit juice before adding the sugar, or that part of the sugar that is not already present in the frozen fruit, where frozen fruit is used. In other words, if the natural (frozen or unfrozen) fruit, fruit juice or concentrate has a pH below 3.5, and particularly if the pH after addition of the pectin solution would be below 3.5, the pH should be adjusted before or at the time of adding the pectin to not less than 3.5 by the addition of an edible alkali metal salt of a weak acid, preferably an organic oxy acid, such for instance as sodium citrate or sodium tartrate, to bring the pH up to at least 3.5. At that pH there is no likelihood of a pre-setting of the mass when the sugar, or balance of the sugar is added, and therefore no difficulty will be experienced in getting all of the sugar into solution that is required to bring the total solids content up to between 55 and 65% by weight of the final mass.

Other food products of our invention can be made from other fruits, concentrates and fruit juices, but, in general, it is preferred to start with the fresh berries either in the natural state or quick-frozen, or in the form of concentrates, since by so doing the freshness of the fruit is realized and retained to the greatest possible extent. To the same end, it is also preferable to refrigerate the product after having been poured from the kettle.

The product of our invention is distinguished from the conventional frozen fruits in that our product can be used directly from the refrigerator, either the quick freeze or the regular food compartment, without preliminary thawing. For one thing, frozen fruits seldom have a sugar content over 27%, while our product has a minimum sugar content of roughly twice that figure. For another thing, our product when "thawed" from a deeply frozen state, remains in a set, or jelled condition. It is free from ice crystals, massive frozen fruit or other objectionably hard constituents. Also, by using invert sugar, the product is free from sugar crystals. Thus, our product is ready for consumption when first taken out of the refrigerator and need not be thawed out prior to use.

It will be understood that modifications and variations

We claim as our invention:

1. The method of making a food product, which comprises incorporating pectin and an edible alkali metal salt of an organic oxy acid into a fruit-sugar mass under such conditions that the resulting mass has a pH not less than 3.5 and a total soluble solids content of between 55 and 65% by weight, whereby water will not freeze out of the mass at 0° F., heating said mass sufficiently if necessary to put all the sugar present into solution, thereafter adjusting the pH of said mass to between 2.90 and 3.25 to set said mass and refrigerating the same.

2. The method of making a food product, which comprises incorporating pectin and a pectin-solubilizing agent into a fruit-sugar mass to produce a resulting mass having a pH between 3.5 and 4.5 and having a dissolved soluble solids content of between 55 and 65% by weight, such that water will not freeze out of the mass at 0° F., thereafter adding sufficient acid to cause the mass to jell upon standing at less than 100° F., and refrigerating said mass.

3. The method of making a food product, which comprises incorporating pectin and an edible alkali metal of an organic oxy acid into a fruit-sugar mass, adjusting the proportions of the ingredients so as to produce a resulting mass having a pH not less than 3.5 and a soluble solids content of between 55 and 65% by weight, whereby water will not freeze out of the mass at 0° F., heating said mass if necessary to put the sugar present into solution, but without ever boiling off any portion of said mass, thereafter adjusting the pH of said mass to between 2.90 and 3.25 to set said mass, and refrigerating said mass.

4. The method of making a food product, which comprises providing an aqueous pectin solution containing an edible alkali metal salt of an organic oxy acid and having a pH of between 3.50 and 4.50, providing an aqueous natural fruit-sugar mass in which the proportions of the ingredients are such as to produce in the final product a soluble solids content of between 55 and 65% by weight, whereby water will not freeze out of said product at 0° F., heating said mass if necessary but not over about 100° F. to put the sugar present into solution, adding a sufficient quantity of said pectin solution to jell said mass and adjusting the pH of said mass to between 2.90 and 3.25 to set said mass.

5. The method of making a fruit product, which comprises providing an aqueous solution of a pectin of at least 200 grade, said solution having a pH between 3.50 and 4.50, providing an aqueous mass of natural, uncooked fruit and sugar having a pH not less than 3.50 and a soluble solids content such as to give a final product of between 55 and 65% by weight soluble solids content, whereby water will not freeze out of said product when the same is cooled to 0° F., heating said mass to a sufficiently high temperature, but without boiling off any portion thereof, to put the sugar content thereof into solution, adding to said mass a sufficient quantity of said aqueous pectin solution containing an edible alkali metal salt of an organic oxy acid to cause said mass to jell when the pH thereof is adjusted to between 2.90 and 3.25, and adjusting the pH of the combined mass and pectin solution to within said range of 2.90 to 3.25.

6. The method of making a fruit product, which comprises providing an aqueous solution of a pectin of at least 200 grade and containing an edible alkali metal salt of an organic oxy acid, said solution having a pH between 3.50 and 4.50, providing an aqueous mass of fruit juice and sugar having a pH of not less than 3.5 and a soluble solids content such that the final product will have a soluble solids content of between 55 and 65% by weight, whereby water will not freeze out of said product when the same is cooled to 0° F., heating said mass to a sufficiently high temperature not above about 100° F., to put the sugar content thereof in solution, adding to said mass a sufficient quantity of said aqueous pectin solution to cause said mass to jell when the pH thereof is adjusted to between 2.90 and 3.25, adjusting the pH of the combined mass and pectin solution to within said range of 2.90 and 3.25, and refrigerating the resulting product.

7. The method of making a fruit-sugar-pectin food product, which comprises providing an aqueous solution of pectin and a pectin-solubilizing agent, said solution being at least 6¼ jelly units grade and having a pH between 3.50 and 4.50, providing a fruit-sugar mass having a pH not less than 3.5 after the required amount of said pectin solution has been added thereto, adjusting the soluble solids content so that the final product has a total soluble solids content between 55 and 65% by weight, adding said pectin solution to said fruit-sugar mass, adjusting the acidity of the final mass to a pH between 2.90 and 3.25 and refrigerating said final product.

References Cited in the file of this patent

UNITED STATES PATENTS

| | | |
|---|---|---|
| 2,137,205 | Cowgill | Nov. 15, 1938 |
| 2,459,431 | Johnson et al. | Jan. 18, 1949 |

OTHER REFERENCES

"New Fresh Fruit Spreads" by Johnson et al., Food Industries, November 1947, pages 80–83, 201 and 202.

"Pectin as Aid in Freezing Fruit" by Baker, Food Industries, January 1941, pages 55–57.